United States Patent [19]

Codrino

[11] 4,000,447
[45] Dec. 28, 1976

[54] ELECTRICAL JUNCTION BOX FOR MOTOR VEHICLES HAVING PRINTED CIRCUIT FUSE MEANS AND CONNECTING MEANS THEREIN

[75] Inventor: Giuseppe Codrino, Quattordio (Alessandria), Italy

[73] Assignee: Cavis-Cavetti Isolatis S.p.A., Felizzano (Alessandria), Italy

[22] Filed: July 11, 1975

[21] Appl. No.: 595,268

[30] Foreign Application Priority Data

July 17, 1974 Italy .................... 53365/74

[52] U.S. Cl. .................... 317/120; 317/101 F; 317/114
[51] Int. Cl.$^2$ .................... H02B 9/00; H05K 5/02
[58] Field of Search .................... 174/52 R, 158 R; 317/99, 101 R, 101 F, 114, 116, 118, 120

[56] References Cited

UNITED STATES PATENTS

| | | | |
|---|---|---|---|
| 3,758,829 | 9/1973 | Kroll | 317/120 |
| 3,780,353 | 12/1973 | Gordon | 317/101 F |
| 3,833,839 | 9/1974 | Debaigt | 317/118 |
| 3,873,889 | 3/1975 | Leyba | 317/101 F |

*Primary Examiner*—Gerald P. Tolin
*Attorney, Agent, or Firm*—Sughrue, Rothwell, Mion, Zinn & Macpeak

[57] ABSTRACT

A junction box for a motor vehicle electrical system for coupling electrical conductors extending from the rear of a vehicle with conductors extending to the front of a vehicle, comprising an integrally moulded body having removable end, top and bottom walls and an intermediate plate which can be slidably engaged in guides in the side walls of the body. The removable end and bottom walls are provided with connector units for connecting electrical conductors of the external circuit to the junction box. These connector units are interconnected internally by flexible printed circuit connectors which also make contact with actuating elements, such as relays, and with printed circuit fuses mounted in sheets on pivoted support plates by means of which fuse changing is facilitated.

2 Claims, 6 Drawing Figures

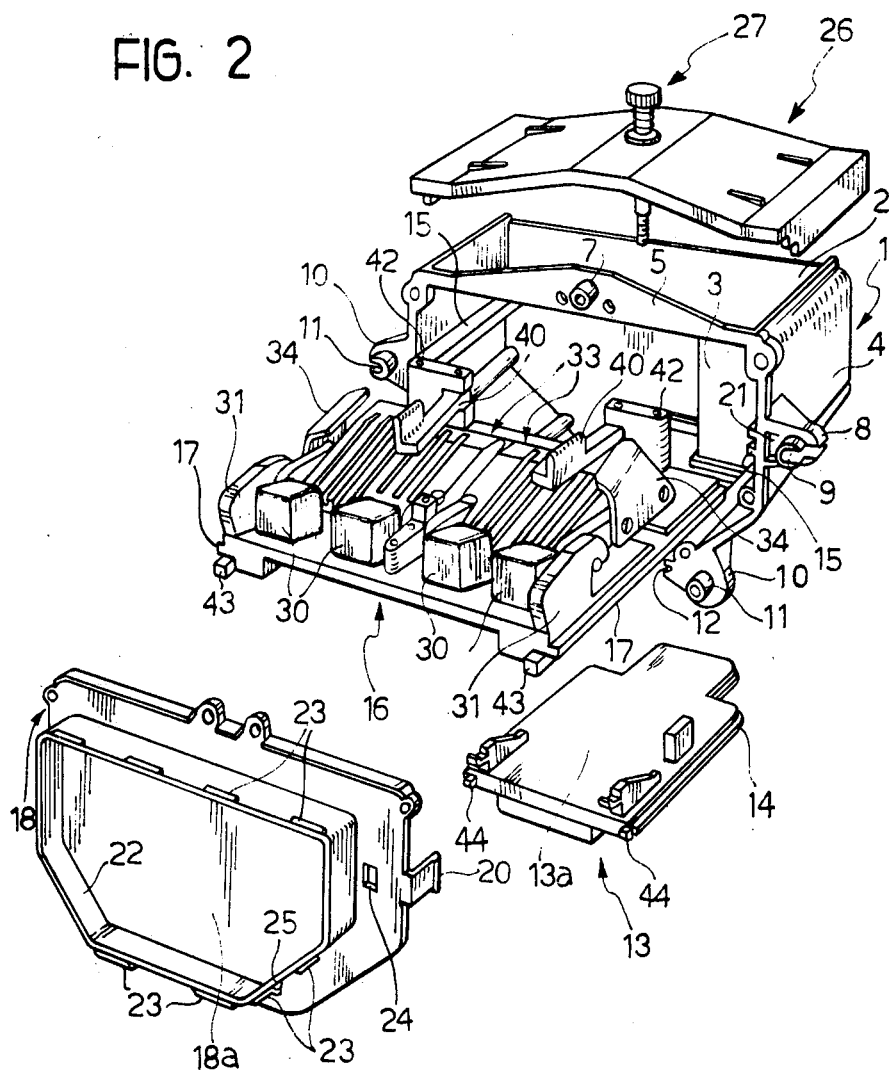

ELECTRICAL JUNCTION BOX FOR MOTOR VEHICLES HAVING PRINTED CIRCUIT FUSE MEANS AND CONNECTING MEANS THEREIN

The present invention relates to electrical junction boxes, and particularly to junction boxes specially adapted for use on motor vehicles. Conveniently a junction box for the electrical circuit of a motor vehicle is adapted to form connections between the electrical conductors of the circuit, the actuating devices such as switches and relays, and the overload protection devices such as fuses, all in such a manner that the length of the electrical conductors is as short as possible and the distribution of the conductors throughout the vehicle is as rational and simple as possible.

Junction boxes of this type are known as such, they are usually located between the dashboard and the front compartment of the motor vehicle so as to be able to connect conductors leading to the front of the vehicle with conductors leading to the rear of the vehicle: the known junction boxes, however, are made for circuits in which the electrical conductors are individual isolated cables, and therefore the fuse carrier unit is provided with connection elements suitable for this type of conductors.

One object of the present invention is to provide a junction box of the previously mentioned type, particularly adapted for use with circuits the electrical conductors of which comprise flexible printed circuits.

A further object of the invention is to produce a junction box of the aforementioned type in which changing the fuses in case of a failure is simpler than has hithertofore been the case with known types of junction box.

According to the present invention, there is provided a junction box for a motor vehicle electrical system characterised by the fact that it comprises a hollow body moulded of plastics material and comprising, with reference to a given orientation, a first end wall, two symmetrical side walls and a transverse crosspiece which connects two corresponding corners of the side walls remote from the said first end wall and extends substantially parallel to the first end wall, a second end wall attachable to the body in a position parallel to the first end wall, a bottom wall the rim of which is housed in lower guideways in the side walls and the first end wall of the body so as to close the bottom of the body, an intermediate plate housed in guideways part way up the side walls, and a transparent lid covering the top of the body, the intermediate plate and the bottom wall being held in place against withdrawal along the said guideways by the said second end wall, the bottom wall and the second end wall being provided with electrical connector units which have connector elements outside the box for connection to conductors of an electrical circuit and which are connected within the box by printed circuit connectors to actuating elements and printed circuit fuse elements carried by the intermediate plate.

The advantages of junction boxes made as embodiments of the present invention are that access to the fuses is simple, to permit ready changing of these in the event of a failure, and that construction of the junction box is simplified by the use of printed circuit connectors.

One embodiment of the invention will now be more particularly described, by way of example, with reference to the accompanying drawings, in which:

FIG. 2 is an exploded perspective view of the embodiment shown in FIG. 1;

Figure 1:
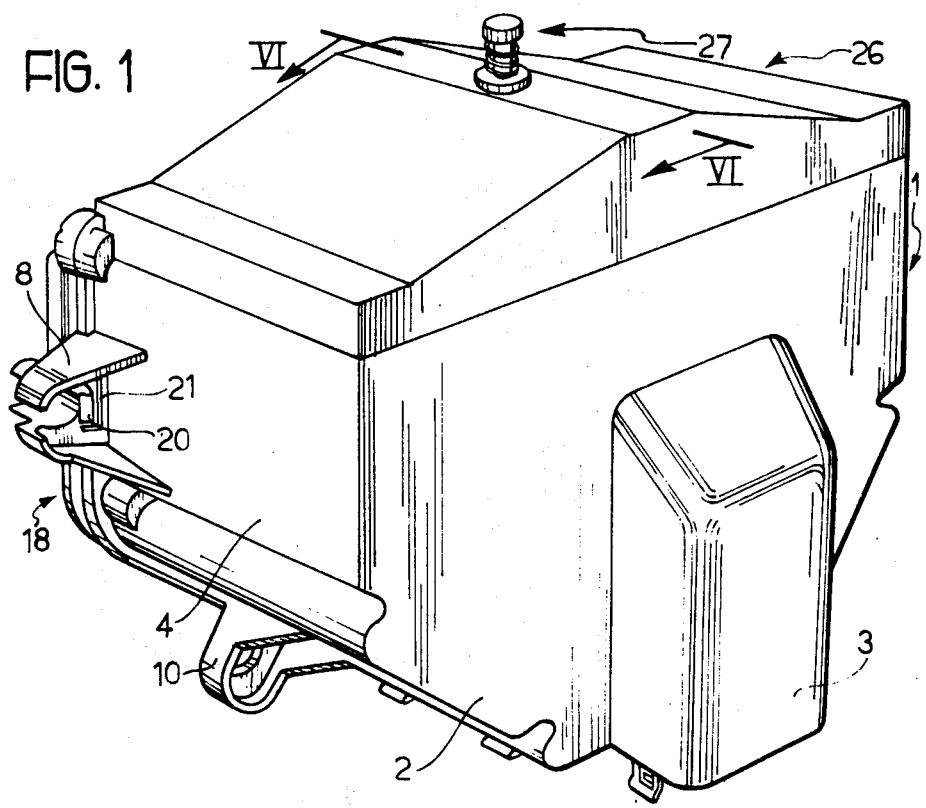
FIG. 1 is a perspective view of a junction box formed as an embodiment of the invention, illustrated in the mounted and closed position.
Figure 4:
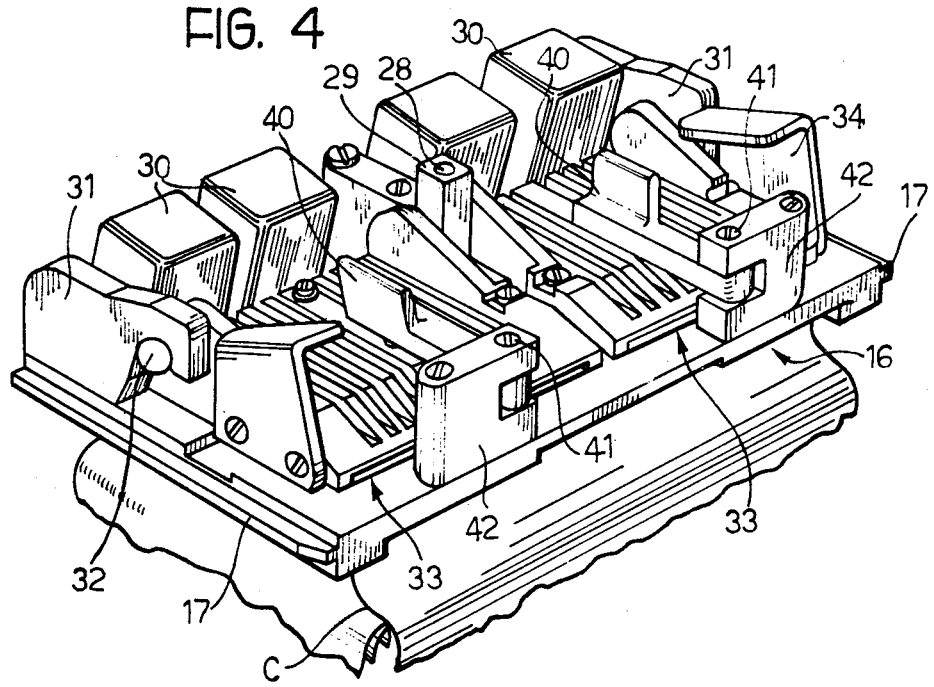
FIGS. 4 and 5 are two perspective views of the intermediate plate shown in FIG. 3, in which fuse carrier elements are shown in the closed position and in the opened positions respectively.
Figure 3:
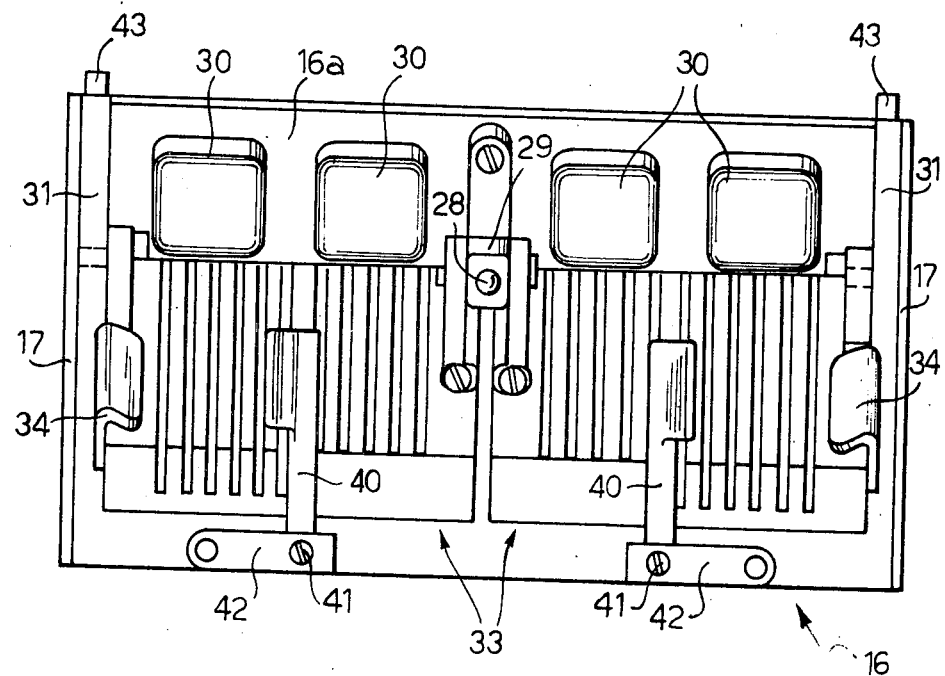
FIG. 3 is a plan view of an intermediate plate located within the junction box.

Referring now to the drawings, there is shown a junction box in a normal upright orientation. The box will be described hereinafter with reference to this orientation and references to "upper" and "lower", "vertical" and "horizontal" components will accordingly be understood to relate to the components of the box when in this orientation. It is envisaged that the junction box would be mounted on the rear face of the bulkhead separating the forward compartment of the vehicle and the passenger compartment, over an opening in this bulkhead and would be connected to the terminals of conductors extending through this opening. References to "front", "rear" and "side" walls will thus be understood with the junction box in this orientation. The junction box shown comprises a main body portion 1, integrally moulded of plastics material and constituted by a substantially vertical rear wall 2, having a rearwardly extending protrusion 3, two side walls 4 each having an upper, substantially vertical part and a lower, inclined part converging downwardly towards the other side wall, and an upper crosspiece 5 bridging the upper corners of the side walls 4 remote from the rear wall 2, extending parallel to the rear wall 2 and carrying centrally a tubular boss 7 which projects away from the rear wall 2 and the axis of which is substantially horizontal.

Two laterally projecting lugs 8, 10, provided with small axial bosses 9, 11 are carried by the side walls and allow the box to be fixed to a suitable support element of the body of the vehicle, such as, for example, the bulkhead which separates the passenger compartment from the forward compartment.

Adjacent the lower edges of the side walls 4 and the rear wall 2 there extend horizontal guideways 12 into which a shaped bottom wall 13 can be inserted: the shape of the bottom wall 13 is such that, when fitted, it covers the lower face of the box including the protuberance 3. This bottom wall 13 is provided with rebated edges 14 which form a tongue which fits into the above mentioned guideways at the lower edges of the side and rear walls.

Part way up, the side walls 4 are provided with respective guideways 15 formed by parallel spaced ridges which extend horizontally and between which a shaped intermediate plate 16 can be inserted; the plate 16 is provided with lateral elongate projections 17 which engage in the guides 15 between the two ridges.

The top of the body 1 is closed by a shaped cover 26, of transparent material, which is fixed by means of a screw 27 which engages in a threaded opening 28 carried by a boss 29 of the intermediate plate 16.

Parallel to the rear wall 2 of the body 1 there is a front wall 18 having lateral resilient tongues 19 terminating in outwardly projecting teeth 20 capable of being snap engaged into slots 21 in the laterally projecting lugs 8 of the body 1. The front wall is also secured to the body 1 by means of screws inserted into aligned threaded openings in the two parts. When the front wall is fitted to the body 1 it locks in place both the removable intermediate plate 16 and the bottom wall 13. From the front face of the front wall 18 projects a continuous closed flange 22 which follows the outline of the front wall 18, but is spaced inwardly from the edges thereof. The flange is provided on its free edge with shaped teeth 23 by means of which the box can be snap engaged into a correspondingly shaped opening in a support element, such as a bulkhead, of the vehicle, so that it is held in place while the screws are fitted through the openings in the bosses 9, 11 and the lugs 8, 10, and through aligned openings in the support element to provide a secure permanent fixing. The wall 18 also has apertures 24, 25 into which engage protuberances 43, 44 carried by the intermediate plate 16 and the bottom wall 13 respectively.

Figure 5:
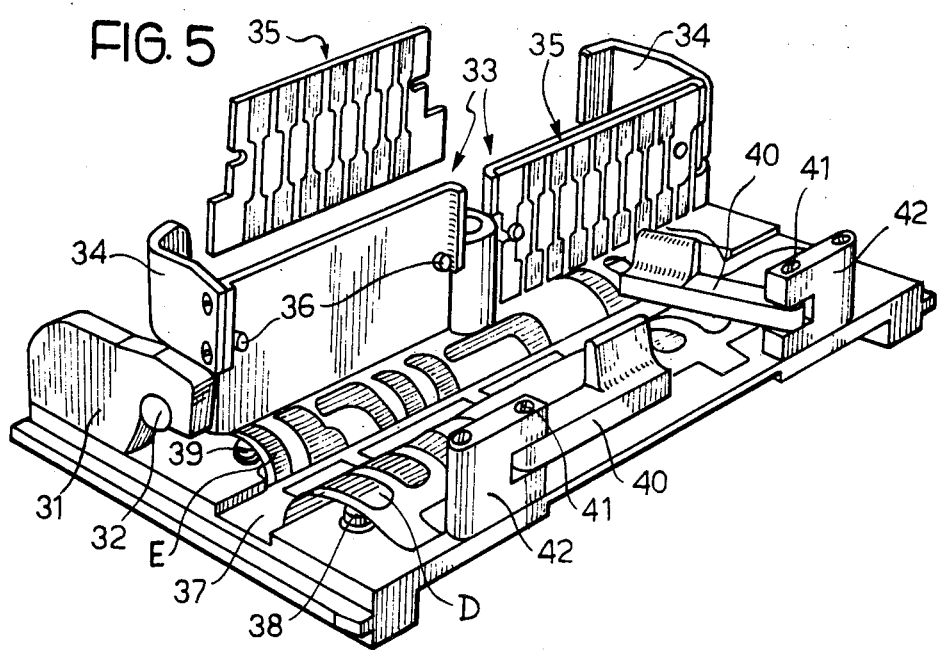
Figure 6:
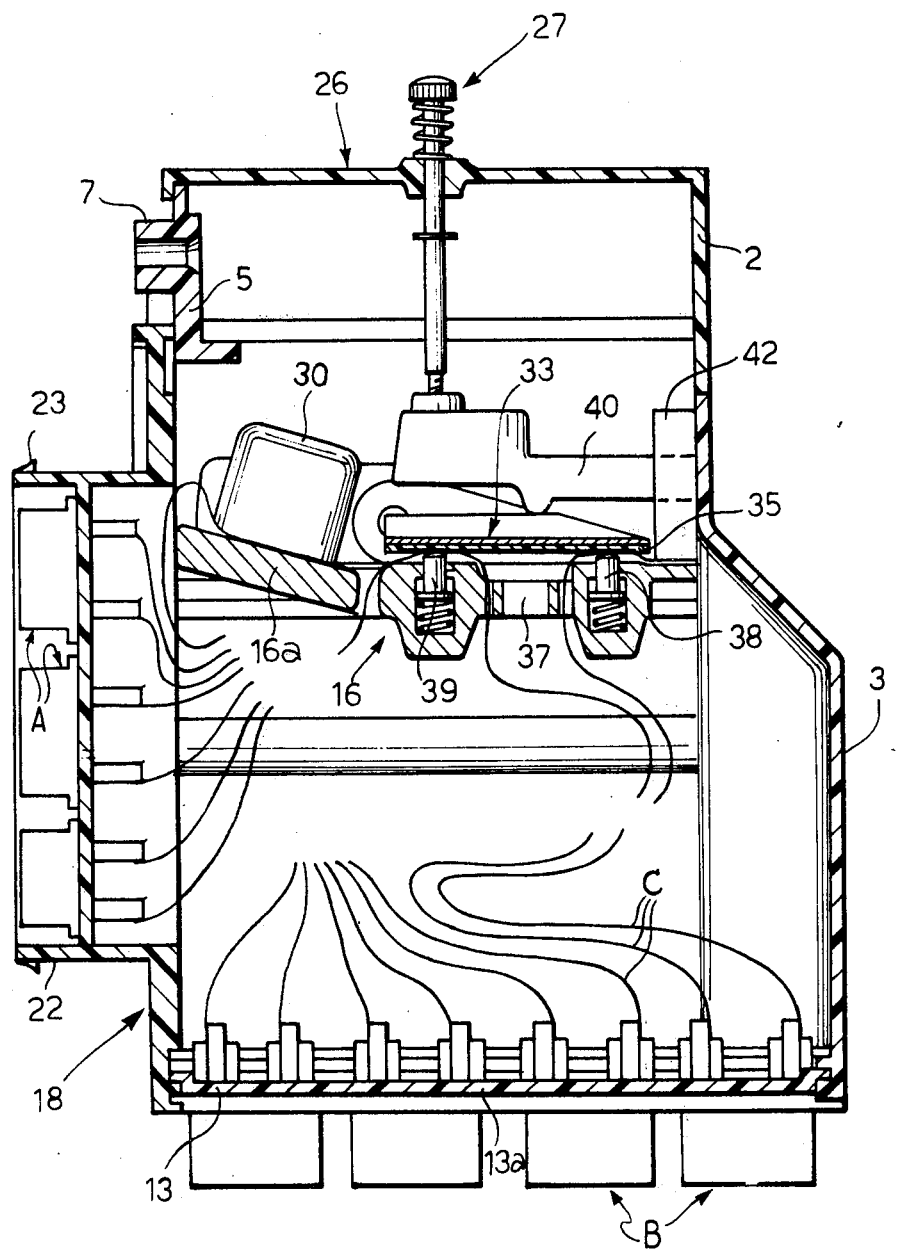
FIG. 6 is a longitudinal section of the embodiment, taken on the line V1—V1 of FIG. 1.

On the central part 18a of the front wall 18 and on the central part 13a of the bottom wall 13 there are mounted respective sets of electrical connectors A, B connected together within the box by flexible printed circuits C. The connectors A project through the wall 18 for connection to conductors leading from the front compartment, whereas the connectors B project through the bottom wall 13 for connection to conductors in the passenger compartment and leading to the rear of the vehicle. The two sets of connectors are also connected by the conductors C to actuating elements 30 such as relays, electromagnets, remote control switches, located on an inclined area 16a of the plate 16, and to sheets of printed circuit fuses carried by the aforementioned plate 16. For this purpose the plate 16 has two pairs of vertical lugs 31 which engage respective pairs of horizontal pins 32 carried by two fuse support plates 33 to form pivots for these two plates. The fuse support plates 33 are ribbed on one face for reinforcement and the opposite face, which is the lower face when the plates are pivoted to lie parallel to the plate 16, are each provided with two pegs 36 onto which can be engaged sheets of printed circuit fuses 35, one on each support plate 33. Each support plate 33 is also provided with a handle 34 by means of which the plates can easily be raised from their lowered position, as shown in FIG. 2, to their raised position as shown in FIG. 5. Two levers 40, mounted on vertical pins 41 carried by the brackets 42 projecting vertically from the intermediate plate (16) are provided for holding the support plates 33 down onto contacts formed by the ends D,E, of the printed circuit connectors C which project through a longitudinal slot 37 in the intermediate plate 16, the ends being held in place by means of protruding connectors 38, 39 carried by the intermediate plate 16 itself. As will be seen from FIG. 5 each fuse in the printed circuit fuse plate comprises a strip of conductive material formed as two relatively wide ends which serve as connector terminals joined by a narrow strip which serves as the fuse itself. When a printed circuit fuse sheet is mounted on a support plate 38 and the plate closed, the wide terminal ends of the fuses make contact with the appropriate conductors at the ends D, E of the printed circuit strips C to complete the circuit. To check the fuses or to change them, it is only necessary to disengage the locking lever 40 and lift the fuse support plates 33 to the vertical position by means of the handles 34, to gain access to the printed circuit fuses 35, for inspection or removal as illustrated in FIG. 5.

I claim:
1. A junction box for a motor vehicle electrical system, comprising:
 a hollow unitary main body incorporating, with reference to a given orientation:
 a first end wall,
 two symmetrical side walls each connected along a first edge to a respective opposite edge of said end wall,
 a transverse bridging member interconnecting corresponding corners of said side walls at a second edge thereof, opposite said first edge,
 means defining first and second aligned guideways in each said side wall, said guideways extending between said first and second edges of said side walls, said first guideways being adjacent the lower edges of said side walls and said second guideways being located at a position part way up the height of said side walls
 a member forming a bottom wall having a rim slidably mounted in said first guideways of said side walls closing the bottom of said unitary body,
 an intermediate plate member having two parallel side edges slidably mounted in said second guideways of said side walls of said unitary body,
 a transparent lid member removably attached to said intermediate plate member closing the top of said unitary body,
 a member forming a second end wall removably attached to said body along the edges of said two side walls opposite the edges connected to said first end wall so as to extend substantially parallel to said first end wall, said second end wall overlying the edges of said bottom wall member and said intermediate plate member to hold these in position against withdrawal along said first and second guideways,
 first and second electrical connector units respectively mounted on said second end wall member and said bottom wall member, said connector units having means for connection to terminals of the conductors of a motor vehicle electrical system,
 printed circuit fuse means carried by movable supports on said intermediate plate member, and
 printed circuit connector means electrically connecting said first and second electrical connector units together, within said body and electrically connecting said printed circut fuse means to said connector units within said body.
2. The junction box of claim 1 wherein said printed circuit fuse means comprise respective printed circuit sheets and said movable supports carrying said printed circuit fuse means comprise respective plates pivotally mounted between upstanding lugs on said intermediate plate member for turning movement about an axis parallel to said intermediate plate member, there also being
 means defining a longitudinal slot in said intermediate plate member extending parallel to said axes of turning movement of said printed circuit fuse support plates, the ends of said printed circuit connectors extending through said elongate slot whereby said printed circuit fuse sheets are contacted therewith when said fuse support plates are turned to a position substantially parallel to said intermediate plate member, and
 pivoted levers mounted on brackets carried by said intermediate plate member and each pivotable about an axis perpendicular to the plane of said intermediate plate member between a first position where it extends over a respective said fuse support plate when the latter is in the position parallel to said intermediate plate member whereby to hold the associated said fuse plate in said position, and a second position where it does not obstruct the pivoting movement of said associated fuse plate.

* * * * *